United States Patent
Cordery et al.

(10) Patent No.: US 6,567,794 B1
(45) Date of Patent: May 20, 2003

(54) METHOD FOR ACCESS CONTROL IN A VIRTUAL POSTAGE METERING SYSTEM

(75) Inventors: Robert A. Cordery, Danbury, CT (US); Frank M. D'Ippolito, Arlington, MA (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/242,205

(22) Filed: Sep. 2, 1999

Related U.S. Application Data

(60) Provisional application No. 60/049,518, filed on Jun. 13, 1997.

(51) Int. Cl.[7] ............................................. G07B 17/00
(52) U.S. Cl. ............................ 705/60; 705/75; 705/401
(58) Field of Search .......................... 705/50, 51, 52, 705/60, 75, 76, 401; 713/168, 182, 202

(56) References Cited

U.S. PATENT DOCUMENTS

| | | | |
|---|---|---|---|
| 4,180,856 A | | 12/1979 | Check, Jr. et al. .......... 364/466 |
| 4,376,299 A | | 3/1983 | Rivest ........................ 364/900 |
| 4,376,981 A | | 3/1983 | Check, Jr. et al. .......... 364/570 |
| 4,423,287 A | * | 12/1983 | Zeidler ........................ 705/71 |
| 4,556,944 A | | 12/1985 | Daniels et al. ............... 364/466 |
| 4,567,359 A | | 1/1986 | Lockwood ................... 235/381 |
| 4,578,530 A | * | 3/1986 | Zeidler ........................ 705/71 |
| 4,725,718 A | * | 2/1988 | Sansone et al. ............. 235/495 |
| 4,757,537 A | * | 7/1988 | Edelmann et al. ............ 380/51 |
| 4,775,246 A | * | 10/1988 | Edelmann et al. ............ 705/62 |

(List continued on next page.)

FOREIGN PATENT DOCUMENTS

| | | |
|---|---|---|
| EP | 0833285 | 4/1998 |
| JP | 06-284124 A | * 10/1994 |
| WO | WO 98/57460 | * 12/1998 |

OTHER PUBLICATIONS

Gips: "Home on the page"; Security Management, Dec. 1999, vol. 43, No. 12, pp. 18–19.*

Gash, Andy; "What was lick and stick has now become click," ABIX—Australasian Business Intelligence, Apr. 14, 1998, p. 20 (Abstract Only).

"Information Based Indicia Program (IBIP) Indicium Specification," United States Postal Service, Draft dated Jul. 23, 1997.

"Information Based Indicia Program (IBIP) Postal Security Device Specification," United States Postal Service, Draft dated Jul. 23, 1997.

"Information Based Indicia Program (IBIP) Host System Specification," United States Postal Service, Draft dated Oct. 9, 1996.

(List continued on next page.)

*Primary Examiner*—Edward R. Cosimano
(74) *Attorney, Agent, or Firm*—Brian A. Lemm; Angelo N. Chaclas; Charles R. Malandra, Jr.

(57) ABSTRACT

A method of remotely accessing a postage security account at a data center from a remote user device begins with a remote user assigning a password to the user's postage security account at a data center. A cryptographic key corresponding to the user's postage security account is provided to the remote user device and is stored at the data center. The password and the cryptographic key are combined at the remote user device and the data center respectively to obtain a user authentication key. An authentication algorithm is performed using the user authentication key to obtain a remote access message. The remote access message is sent to the data center to initiate request for access to the postage security account by the remote user device. The remote user device is authenticated for accessing the postage security account when the data center verifies the remote access message.

13 Claims, 6 Drawing Sheets

U.S. PATENT DOCUMENTS

| | | | | |
|---|---|---|---|---|
| 4,802,218 | A | * | 1/1989 | Wright et al. .................. 705/60 |
| 4,812,994 | A | | 3/1989 | Taylor et al. .......... 364/464.02 |
| 4,831,555 | A | * | 5/1989 | Sansone et al. ............ 358/1.14 |
| 4,873,645 | A | * | 10/1989 | Hunter et al. ............... 700/231 |
| 4,873,646 | A | * | 10/1989 | Stoops ........................ 702/67 |
| 4,936,209 | A | | 6/1990 | Diel ........................ 101/93.01 |
| 5,128,988 | A | | 7/1992 | Cowell et al. ............. 379/107 |
| 5,146,403 | A | | 9/1992 | Goodman ................... 364/401 |
| 5,163,098 | A | * | 11/1992 | Dahbura ...................... 705/75 |
| 5,191,533 | A | | 3/1993 | Haug .................... 364/464.03 |
| 5,239,168 | A | | 8/1993 | Durst, Jr. .................... 235/432 |
| 5,257,196 | A | | 10/1993 | Sansone ............... 364/464.02 |
| 5,319,562 | A | | 6/1994 | Whitehouse ........... 364/464.03 |
| 5,410,598 | A | * | 4/1995 | Shear .......................... 705/53 |
| 5,454,038 | A | | 9/1995 | Cordery et al. ............... 380/23 |
| 5,491,796 | A | | 2/1996 | Wanderer et al. ...... 395/200.09 |
| 5,510,992 | A | * | 4/1996 | Kara .......................... 705/408 |
| 5,526,428 | A | * | 6/1996 | Arnold ....................... 713/159 |
| 5,590,198 | A | * | 12/1996 | Lee et al. ..................... 705/61 |
| 5,625,694 | A | | 4/1997 | Lee et al. ..................... 380/23 |
| 5,680,463 | A | | 10/1997 | Windel et al. ................ 380/51 |
| 5,699,258 | A | | 12/1997 | Thiel .................... 364/464.19 |
| 5,781,438 | A | | 7/1998 | Lee et al. .............. 364/464.14 |
| 5,812,401 | A | | 9/1998 | Moore ........................ 705/410 |
| 5,812,666 | A | | 9/1998 | Baker et al. .................. 380/21 |
| 5,812,991 | A | | 9/1998 | Kara .......................... 235/375 |
| 5,822,739 | A | | 10/1998 | Kara .......................... 235/375 |
| 5,826,247 | A | | 10/1998 | Pintsov et al. .............. 705/404 |
| 5,943,658 | A | | 8/1999 | Gravell et al. .............. 705/410 |
| 6,005,945 | A | | 12/1999 | Whitehouse ................. 380/51 |
| 6,061,670 | A | | 5/2000 | Brand ........................ 705/404 |
| 6,085,181 | A | | 7/2000 | Gravell et al. .............. 705/408 |
| 6,249,777 | B1 | | 6/2001 | Kara et al. .................. 705/404 |
| 6,295,359 | B1 | | 9/2001 | Cordery et al. ............... 380/44 |

OTHER PUBLICATIONS

"Information Based Indicia Program (IBIP) Key Management Plan," United States Postal Service, Draft dated Apr. 25, 1997.

Specification of U.S. patent application Ser. No. 09/242,210, titled "Virtual Postage Metering System," filed Jun. 12, 1998.

Specification of U.S. patent application Ser. No. 09/242,208, titled "System and Method for Controlling a Postage Metering Using Data Required for Printing," filed Jun. 12, 1998.

Specification of U.S. patent application Ser. No. 09/242,209, titled "System and Method for Dynamic Selection of Appropriate Postal Rates Based on Metering Data," filed Jun. 12, 1998.

Specification of U.S. patent application Ser. No. 09/242,206, titled "Virtual Postage Meter With Multiple Origins of Deposit," filed Jun. 12, 1998.

Specification of U.S. patent application Ser. No. 09/242,207, titled "Virtual Postage Meter With Secure Digital Signature Device," filed Jun. 12, 1998.

* cited by examiner

METHOD FOR ACCESS CONTROL IN A VIRTUAL POSTAGE METERING SYSTEM

This is a continuation-in-part application of U.S. Provisional Patent Application Ser. No. 60/049,518, filed Jun. 13, 1997, now abandoned, and assigned to the assignee of the present invention.

RELATED APPLICATIONS

The present application is related to the following U.S. patent applications Ser. Nos. 09/242,210; 09/242,208; 09/242,209; 09/242,206 and 09/242,207, all being assigned to the assignee of the present invention, all of which are incorporated herein by reference in their entirety.

TECHNICAL FIELD

The present invention relates generally to a postage metering system and method for evidencing postage payment in an open system and, more particularly, to a postage metering system and method for evidencing postage payment in a virtual meter configuration.

BACKGROUND ART

Postage metering systems have been developed which employ encrypted information that is printed on a mailpiece as part of an indicium evidencing postage payment. The encrypted information includes a postage value for the mailpiece combined with other postal data that relate to the mailpiece and the postage meter printing the indicium. The encrypted information, typically referred to as a digital token or a digital signature, authenticates and protects the integrity of information, including the postage value, imprinted on the mailpiece for later verification of postage payment. Since the digital token incorporates encrypted information relating to the evidencing of postage payment, altering the printed information in an indicium is detectable by standard verification procedures. Examples of systems that generate and print such indicium are described in U.S. Pat. Nos. 4,725,718, 4,757,537, 4,775,246 and 4,873,645, each assigned to the assignee of the present invention.

Presently, there are two postage metering device types: closed system and open system. In a closed system, the system functionality is solely dedicated to metering activity. Examples of closed system metering devices, also referred to as postage evidencing devices, include conventional digital and analog (mechanical and electronic) postage meters wherein a dedicated printer is securely coupled to a metering or accounting function. In a closed system, typically the printer is securely coupled and dedicated to the meter, and printing evidence of postage cannot take place without accounting for the evidence of postage. In an open system, the printer is not dedicated to the metering activity, freeing system functionality for multiple and diverse uses in addition to the metering activity. Examples of open system metering devices include personal computer (PC) based devices with single and/or multi-tasking operating systems, multi-user applications and digital printers. An open system metering device is a postage evidencing device with a non-dedicated printer that is not securely coupled to a secure accounting module. An open system indicium printed by the non-dedicated printer is made secure by including addressee information in the encrypted evidence of postage printed on the mailpiece for subsequent verification. See U.S. Pat. Nos. 4,725,718 and 4,831,555, each assigned to the assignee of the present invention.

The United States Postal Service ("USPS") has proposed an Information-Based Indicia Program ("IBIP"), which is a distributed trusted system to retrofit and augment existing postage meters using new evidence of postage payment known as information-based indicia. The program relies on digital signature techniques to produce for each envelope an indicium whose origin can be authenticated and content cannot be modified. IBIP is expected to support new methods of applying postage in addition to the current approach, which typically relies on a postage meter to print indicia on mailpieces. IBIP requires printing a large, high density, two-dimensional ("2-D") bar code on a mailpiece. The 2-D bar code encodes information and is signed with a digital signature.

The USPS has published draft specifications for IBIP. The INFORMATION BASED INDICIA PROGRAM (IBIP) INDICIUM SPECIFICATION, dated Jun. 13, 1996, and revised Jul. 23, 1997, ("IBIP Indicium Specification") defines the proposed requirements for a new indicium that will be applied to mail being created using IBIP. The INFORMATION BASED INDICIA PROGRAM POSTAL SECURITY DEVICE SPECIFICATION, dated Jun. 13, 1996, and revised Jul. 23, 1997, ("IBIP PSD Specification") defines the proposed requirements for a Postal Security Device ("PSD"), which is a secure processor-based accounting device that dispenses and accounts for postal value stored therein to support the creation of a new "information based" postage postmark or indicium that will be applied to mail being processed using IBIP. The INFORMATION BASED INDICIA PROGRAM HOST SYSTEM SPECIFICATION, dated Oct. 9, 1996, defines the proposed requirements for a host system element of IBIP ("IBIP Host Specification"). IBIP includes interfacing user, postal and vendor infrastructures, which are the system elements of the program. The INFORMATION BASED INDICIA PROGRAM KEY MANAGEMENT PLAN, dated Apr. 25, 1997, defines the generation, distribution, use and replacement of the cryptographic keys used by the USPS product/service provider and PSDs ("IBIP KMS Specification"). The specifications are collectively referred to herein as the "IBIP Specifications".

The IBIP Specifications define a stand-alone open metering system, referred to herein as a PC Meter comprising a PSD coupled to a computer system, such as a personal computer, ("PC") which operates as a host system with a printer coupled thereto ("Host PC"). The Host PC runs the metering application software and associated libraries (collectively referred to herein as "Host Applications") and communicates with one or more attached PSDs. The PC Meter can only access PSDs coupled to the Host PC. There is no remote PSD access for the PC Meter.

The PC Meter processes transactions for dispensing postage, registration and refill on the Host PC. Processing is performed locally between the Host PC and the PSD coupled thereto. Connections to a Data Center, for example for registration and refill transactions, are made locally from the Host PC through a local or network modem/internet connection. Accounting for debits and credits to the PSD is also performed locally, logging the transactions on the Host PC. The Host PC may accommodate more than one PSD, for example supporting one PSD per serial port. Several application programs running on the Host PC, such as a word processor or an envelope designer, may access the Host Applications.

The IBIP Specifications do not address an IBIP open metering system on a network environment. However, the specifications do not prohibit such a network-based system. Generally, in a network environment a network Server controls remote printing requested by a Client PC on the network. Of course, the Client PC controls any local printing.

One version of a network metering system, referred to herein as a "virtual meter", has many Host PCs without any PSDs coupled thereto. The Host PCs run Host Applications, but all PSD functions are performed on Server(s) located at a Data Center. The PSD functions at the Data Center may be performed in a secure device attached to a computer at the Data Center, or may be performed in the computer itself. The Host PCs must connect with the Data Center to process transactions such as postage dispensing, meter registration, or meter refills. Transactions are requested by the Host PC and sent to the Data Center for remote processing. The transactions are processed centrally at the Data Center and the results are returned to the Host PC. Accounting for funds and transaction processing are centralized at the Data Center. See, for example, U.S. Pat. Nos. 5,454,038 and 4,873,645, which are assigned to the assignee of the present invention.

The virtual meter does not conform to all the current requirements of the IBIP Specifications. In particular, the IBIP Specifications do not permit PSD functions to be performed at the Data Center. However, it is understood that a virtual meter configuration with each mailer's PSD located at the Data Center may provide an equivalent level of security as required by the IBIP Specifications.

In conventional closed system mechanical and electronic postage meters a secure link is required between printing and accounting functions. For postage meters configured with printing and accounting functions performed in a single, secure box, the integrity of the secure box is monitored by periodic inspections of the meters. More recently, digital printing postage meters typically include a digital printer coupled to a metering (accounting) device, which is referred to herein as a postal security device (PSD). Digital printing postage meters have removed the need for physical protection of the link by cryptographically securing the link between the accounting and printing mechanisms. In essence, new digital printing postage meters create a secure point to point communication link between the PSD and print head. See, for example, U.S. Pat. No. 4,802,218, issued to Christopher B. Wright et al. and now assigned to the assignee of the present invention. An example of a digital printing postage meter with secure print head communication is the Personal Post Office™ manufactured by Pitney Bowes Inc. of Stamford, Conn.

In U.S. Pat. Nos. 4,873,645 and 5,454,3038, a virtual metering system and method are disclosed wherein the postal accounting and token generation occur at a data center remote from the postage evidencing printer. Although the Data Center may be a secure facility, there remain certain inherent security issues since the accounting and token generation functions do not occur in a secure device local to the postage printer. The virtual postage metering system includes a computer coupled to an unsecured printer and to a remote data metering system. The postal accounting and the token generation occur at the Data Center.

Various Posts, including the United States Postal Service (USPS), are now considering the viability of a virtual postage metering system. The Data Center is a centralized facility under the control of a meter vendor, such as Pitney Bowes, or the Postal Service. However, remote access to mailer account information, i.e. metering information, is a concern.

In one type of remote access, such as an ATM card, an identification password or PIN is used in conjunction with a secure box into which the ATM card is inserted to initiate a transaction. The secure box and a data center in combination with the card and PIN authenticate the user initiating the transaction. In a virtual postage metering system, no secure device is available to the user initiating a request for postage. One solution may be to distribute a secret key to each mailer. However, when distributing such keys, once the key is compromised, the mailer's account is in jeopardy.

DISCLOSURE OF THE INVENTION

It has been determined that a virtual postage metering system provides benefits that are not available under conventional postage payment systems. For the Posts, a virtual postage metering system provides central management of all postage without the need to manage physical meters or PSDs. A further benefit is the opportunity to directly associate a mailer to each mailpiece as opposed to each reset. For mailers, no metering hardware, i.e. postage meter or PSD, is needed. Nor do mailers need to maintain current lists of valid addresses, such as with purchased CD-ROMs. Mailers can acquire postage on an as-needed basis. Finally, meter vendors do not have to keep track of physical meters. A virtual postage metering system eliminates stolen or relocated meter problems and simplifies meter management in general.

The present invention provides a method for securely controlling access to a mailer's account, which resides at a virtual meter data center. The present invention comprises means to authenticate a mailer, the secure distribution of mailer (user) authentication keys and the use of a secure box to execute the authentication algorithms. The database in the virtual meter data center holds the mailer authentication keys in cipher text to prevent exposure of the keys in plain text. The keys are only decrypted when used within the secure authentication box.

The present invention provides a method of remotely accessing a postage security account at a data center from a remote user device begins with a remote user assigning, or being assigned, a password to the user's postage security account at a data center. A cryptographic key corresponding to the user's postage security account is provided to the remote user device and is stored at the data center. The password and the cryptographic key are combined at the remote user device and the data center respectively to obtain a user authentication key. An authentication algorithm is performed using the user authentication key to obtain a remote access message. The remote access message is sent to the data center to initiate request for access to the postage security account by the remote user device. The remote user device is authenticated for accessing the postage security account when the data center verifies the remote access message.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

BEST MODE FOR CARRYING OUT THE INVENTION

Figure 1:
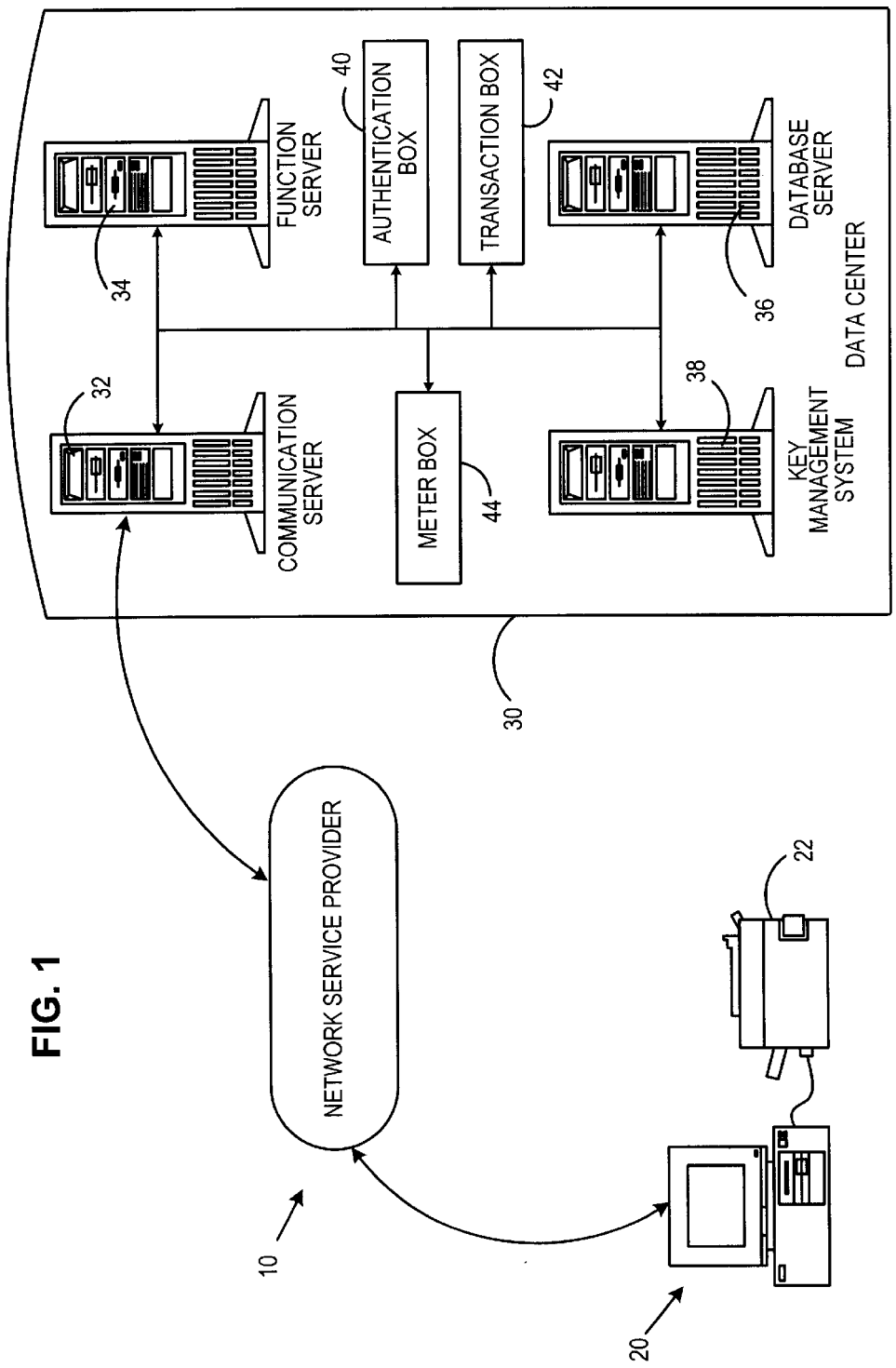
FIG. 1 is a block diagram of a virtual postage metering system for dispensing postage embodying the principles of the present invention.

In describing the present invention, reference is made to the drawings, wherein there is seen in FIG. 1, a virtual postage metering system, generally designated 10. The virtual postage metering system 10 includes a plurality (only one is shown) of personal computer (PC) systems, generally designated 20, each having access to a printer 22 for printing evidence of postage on an envelope. PC 20 is connected with a transaction processing Data Center 30 that performs postal accounting and evidencing of postage. The virtual postage metering system 10 allows each mailer to use a conventional PC to remotely obtain evidence of postage payment on an as needed basis. Unlike conventional postage metering systems, virtual postage metering system 10 does not include any meter hardware located at the mailer's site. Nor are any postal funds stored at the mailer's site. All metering and accounting of funds occur at Data Center 30 using functional software and database records representing each mailer's "postage meter", referred to herein as a "meter account".

The accounting method for virtual postage metering system 10 may be a conventional prepayment or post-payment system. The preferred method is a prepayment method wherein each mailer is required to put a minimum amount of money into the mailer's virtual meter account. As account funds drop below a specific level a refill is charged against the mailer's account. An alternate accounting method that is suitable for a virtual postage metering system is a real-time payment method in which the amount of a transaction is charged to a mailer's credit card account when the transaction occurs. This method is referred to herein as a "trickle charge" postage payment, because the mailer does not pay for postage for a mailpiece until the mailer is ready to print the mailpiece.

In the virtual postage metering system, a "meter" vendor, such as Pitney Bowes Inc., provides the mailer with client software that runs on PC 20, e.g., the client software may be downloaded from the vendor's Internet server. Alternatively, the client software may be Internet browser-based pages that provide mailer interactions with the Data Center 30. The meter vendor also manages Data Center 30. The client software initiates communications with Data Center 30 which performs metering transactions to evidence postage for single mailpieces or batches of mailpieces. In the preferred embodiment, the client software establishes a connection to the Data Center, and requests postage by providing postal information relating to the requested transactions, such as postage amount, addressee information and (optionally) the origin of deposit for each mailpiece. Data Center 30 receives the postal information, determines the origin zip for the mailpiece(s), performs accounting functions and generates an encrypted evidence of postage payment, such as a token or digital signature, and sends indicium information including the token, to PC 20. PC 20 receives the indicium information, creates an indicium bitmap, which can be displayed on a PC monitor (not shown) and printed on the mailpiece by printer 22. PC 20 then disconnects from Data Center 30 or requests another transaction. The connection between PC 20 and Data Center 30 may be through a Network Service Provider, such as on the Internet, or by direct dial using the PC's modem.

Virtual postage metering system 10 eliminates the need to maintain and account for traditional metering devices at each mailer's site and provides flexibility for handling requests from multiple origins of deposit by each mailer. Virtual postage metering system 10 also provides value added services that are not available with conventional meter devices, such as, real-time address hygiene, direct marketing services and trickle charge postage payment. Virtual postage metering system 10 provides mailer authentication by Data Center 30 to identify mailers with valid accounts. When a mailer has been authenticated for each request, for example, by a username, password or other conventional methods, Data Center 30 services the request, and returns indicium information to the PC 20 where the indicium is created and printed on the mailpiece.

Referring again to FIG. 1, the mailer initiates a postage evidencing transaction by running client software in PC 20, which contacts Data Center 30. At Data Center 30, a Communication Server 32 supports connectivity from various communication technologies and protocols. The Communication Server merges all incoming traffic and routes it to a Function Server 34, which includes application software that supports mailer sign-on, postage dispensing and postal reporting. All mailer and meter information is accessed from a Database Server 36 where the information is securely stored using secure cryptographic processes and protocols as described below. Data Center 30 maintains cryptographic keys for each meter account in Database Server 36. The cryptographic keys are used for postage evidencing and verification as well as for security of the records stored in Database Server 36. A Key Management System 38 administers all cryptographic keys used in virtual postage metering system 10. The cryptographic keys may be distributed to verifiers in remote locations. U.S. Pat. No. 5,812,666, assigned to the assignee of the present invention, describes such a key management system.

A mailer may establish a meter account through an on-line sign-up process with Data Center 30. During sign-up, the mailer enters, at PC 20, account information, such as user name, password and method of payment. Any registration fees can be charged at this time. Data Center 30, preferably administered by a meter vendor, such as Pitney Bowes Inc., arranges all meter licenses and agreements between its mailers and the Post.

In the present invention, the PSD does not exist, i.e., there is no metering device coupled to the PC from which postage payment is requested. Virtual postage metering system 10 replaces the accounting and metering functions of the PSD with metering software and mailer account information performed and updated at Data Center 30. The virtual postage metering system 10 provides each mailer with a metering system that has the capability of originating transactions from multiple origins of deposit. See, for example, previously noted U.S. patent application Ser. No. 09/242,206.

Various methods can be used to determine the origin of deposit for a requested transaction. For example, a method for determining origin zip code using a caller ID from a telephone call is disclosed in U.S. Pat. No. 5,943,658, assigned to the assignee of the present invention, which is hereby incorporated in its entirety by reference.

In accordance with the present invention, one or more cryptographic modules, referred to herein as secure "boxes", are located within Data Center 30 and are used to perform cryptographic processes. Each secure box is a secure, tamper-evident, tamper-resistant and tamper-responding device, including a processor and memory, that stores encryption keys and performs cryptographic operations using the keys within the secure boundary of the device. Data Center 30 includes several types of secure boxes, which are described below. In the preferred embodiment, Data Center 30 includes multiple boxes of each type for redundancy and performance.

Key Management System 38 includes a manufacturing box (not shown) that provides top-level keys used to generate random numbers for seeding each of the other secure boxes. By sharing cryptographic keys (secret and/or public), the secure boxes communicate securely within Data Center 30. Key Management System 38 also includes a "steel" box (not shown) that shares a common key with meter box 44 to encryptdecrypt master token keys for postage evidencing transactions for each meter account. The steel box merges a vendor key and a postal key into one record in cipher text. For each meter account, Data Center 30 creates a logical meter, i.e. a meter record, in Database Server 36 by generating a token key using the vendor and postal keys, initializing meter registers (ascending and descending), meter freshness data (described below) and other postal information as part of the meter record, and then storing the meter record in Database Server 36.

Data Center 30 also includes a meter box 44 that shares a secret key with the steel box for decrypting the token key encrypted in the meter record. Meter box 44 also holds the key used for digital signature of transaction records. The only other information stored in meter box 44 is freshness data for each meter record processed by meter box 44. For each postage transaction, meter box 44 generates at least one digital token or signs the postage transaction, and updates the meter record corresponding to the transaction. Each meter record in Database Server 36 includes postal funds as well as the token keys in cipher text. Meter box 44 uses the token keys to generate tokens, updates the postal funds in the meter record, and signs the updated meter record. In this manner, meter box 44 performs and controls the secure accounting for each transaction. Meter box 44 can also be used to verify the token or the transaction signature for verification of the postage evidencing for the transaction.

Data Center 30 also includes an authentication box 40 that shares a different secret key with the steel box to decrypt a mailer authentication key stored in cipher text in Database Server 36. Authentication box 40 also executes the authentication algorithms using the decrypted authentication key to authenticate a mailer.

Finally, Data Center 30 includes an transaction box 42 that shares another secret key with the steel box to sign mailer transaction records other than the meter records signed by meter box 44, such as logins and login history records. Transaction box 42 later verifies the transaction record signature when the next transaction is requested.

It will be understood that the functions described for meter box 44, authentication box 40 and transaction box 42 can be logically separated and combined in one box. In the preferred embodiment of the present invention, at least the functions of authentication box 40 and meter box 44 are performed in separate secure boxes.

Figure 2:
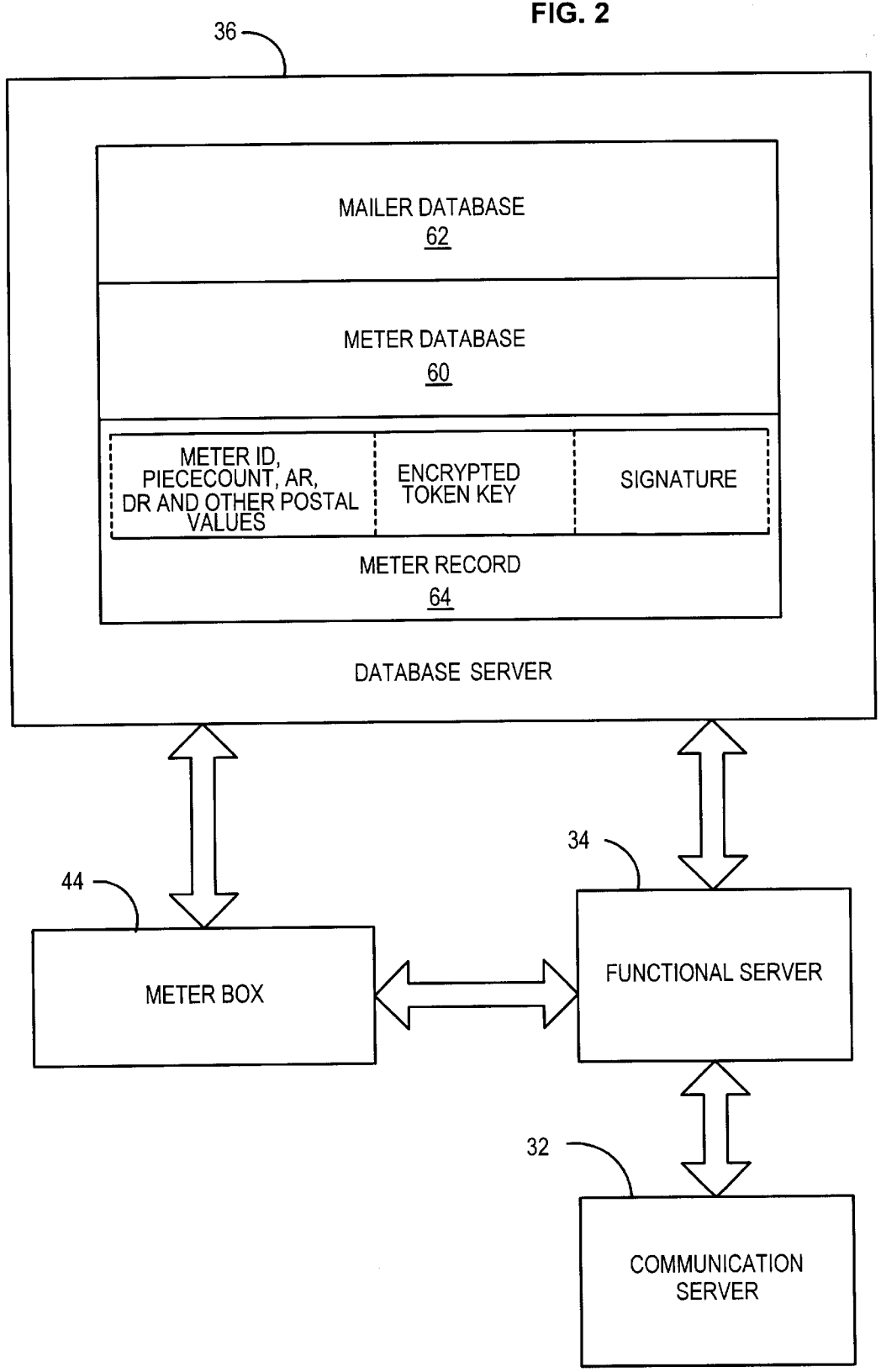
FIG. 2 is a block diagram of the Data Center database server and secure box for the virtual postage metering system of FIG. 1.

Referring now to FIG. 2, a configuration of Database Server 36, including a meter database 60, a mailer database 62 and a database of meter records 64, is shown. Meter database 60 comprises meter information associated for each meter account, such as, meter serial number, piece count of last mailpiece, ascending register, descending register and other postal values. Mailer database 62 comprises mailer information and information that associates a mailer with a meter account.

In operation, Communication Server 32 receives a request for a meter transaction from mailer PC 20. The application software in the Function Server 34 controls the processing of the transaction request. Function Server 34 accesses mailer database 62 and meter database 60 to obtain records, including the appropriate meter record 64, corresponding to the meter account of the mailer initiating the request. Function Server 34 communicates mailer records from mailer database 62 to authentication box 40, which then authenticates the mailer requesting the transaction. Once the mailer has been authenticated, Function Server 34 communicates the appropriate meter record 64 to meter box 44, which verifies a signature and freshness data for the record. Meter box 44 decrypts the encrypted key(s) that are stored within meter record 64, performs accounting functions on the ascending and descending registers in meter record 64, and uses the key(s) to generate a token for the requested transaction. Meter box 44 then generates data for an indicium, and once again signs meter record 64. The updated and signed record is then sent back to Database Server 36 here it is stored as part of meter database 60.

At Data Center 30, the authentication keys are not available in plain text, but must be distributed to the mailer. Conventional methods of distributing and updating the authentication key for each mailer can be used. See, for example, previously noted U.S. Pat. No. 5,812,666, which describes a key management system for distributing and updating cryptographic keys to the secure boxes and the mailer's PC.

In the preferred embodiment of the present invention, one common key is used to sign all transactions and records that require a digital signature, such as, meter records, postage transactions, funds transfer records, master account records, etc. Multiple boxes of each box are used for redundancy and to share the workload as the number of transactions grow. The signing box, such as meter box 44 or authentication box 40, will also verify the signature of a record.

With regard to the signature algorithm for meter record 64, a message authentication code (MAC) is employed to provide message integrity for the sensitive virtual meter records. This MAC involves multiple applications of the Data Encryption Standard (DES). The main requirement for generation of the signature keys is that the resulting keys are unpredictable. (The signature keys will be updated using the current month and year.) During manufacturing, two initial master signature keys will be entered into the non-volatile memory (NVM) of the secure signature device, i.e. meter box 44. NVM is used both for permanent storage and for the prevention of external access to the key information. The signature keys are generated or updated from the master signature keys and the current month and year in a conventional manner. The virtual meter record signature verification algorithm simply recalculates the to signature of the meter record 64 using the signature algorithm and data within meter record 64 and compares calculated signature to the signature in meter record 64.

In accordance with the preferred embodiment of the present invention, an authentication protocol for the virtual postage metering system uses a shared secret between the Data Center 30 and a remote PC 20. To authenticate a mailer (also referred to herein as a user) to the virtual meter data center, the mailer must possess a secret key and a password.

The secret key is preferably stored on removable media, such as a floppy diskette or dongle, so that only the mailer in possession of the removable media may access the account. Only the mailer knows the password. The secret key and the password are combined to form the authentication key that is used in the authentication protocol. For each mailer having a mailer account at Data Center 30, Data Center 30 stores the mailer's secret key in Database Server 36. When the mailer's account is initialized the mailers password is combined with the secret key to form the authentication key which is stored in encrypted form in mailer database 62 at Data Center 30. For subsequent communications, Data Center uses the stored authentication key, whereas PC 20 generates the authentication key using two pieces of information, i.e., the stored secret key and the user password.

A simple but effective method of combining the two pieces is to exclusive-or the secret key and the ASCII representation of the password to form the authentication key used. Although this method is suitable, it has the drawback of restricting the number of characters in the password to the length of the secret key in bytes. An alternate method of combining the secret key and password first compresses the ASCII representations of the characters in the password. One example restricts the password to alphanumeric characters only and encodes each character with 6 bits or using a cryptographic hash to compress the password to the desired size. Again, the password would be exclusive-ored with the secret key to produce the authentication key. The latter method allows longer passwords to be used, although both methods are sufficient for a desired level of security.

Figure 3:
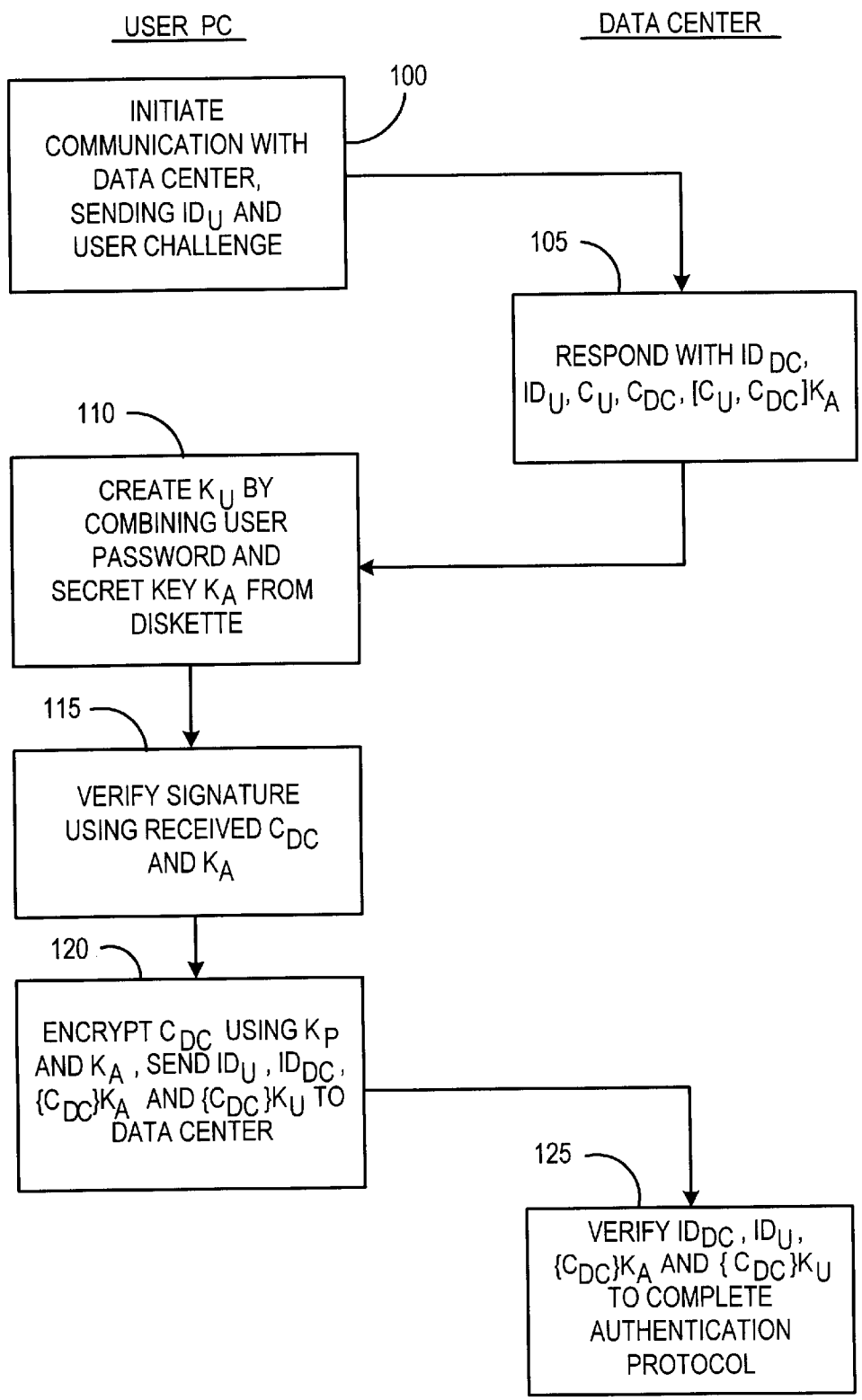
FIG. 3 is a flow chart of an alternate authentication protocol for the virtual postage metering system of FIG. 1.

Referring now to FIG. 3, one embodiment of the present invention is shown wherein the password is used as a key itself for the authentication protocol. $K_A$ is the secret key stored on the user's removable media and $K_U$ is an authentication key derived from the user's password. $ID_U$ is the user's ID, $ID_{DC}$ is the Data Center ID, $C_U$ is the user's challenge, $C_{DC}$ is the Data Center's challenge, $[C_U, C_{DC}]K_A$ denotes a digital signature of the user's challenge and the Data Center's challenge signed with the secret key, $\{C_{DC}\}K_A$ denotes an encryption of the Data Center's challenge using the secret key, and $\{C_{DC}\}K_U$ denotes an encryption of the Data Center's challenge using the authentication key. Authentication is assured by knowledge of the user's authentication key $K_U$ that is established by combining $K_A$ and the user's password prior to any communication.

At step 100, PC 20 initiates communication with Data Center 30, sending the user's ID and the user's challenge in plain text to Data Center 30. At step 105, Data Center 30 responds with plain text of the Data Center ID, the user's ID, the user's challenge and the Data Center's challenge, and a digital signature of the user's challenge and the Data Center's challenge signed with the secret key. At step 110, PC 20 creates the user's authentication key $K_U$ by combining the user's password and secret key $K_A$ stored on a diskette, the distribution of which is described below. At step 115, PC 20 verifies the digital signature of the user's challenge and the Data Center's challenge using secret key $K_A$. If not verified, the Data Center is alerted and the communication terminated. At step 120, PC 20 encrypts the Data Center's challenge using the user's authentication key $K_U$ and encrypts it again using secret key $K_A$. PC 20 then sends to Data Center 30 the user's ID, the Data Center ID, and the two encryptions of the Data Center's challenge. At step 125, Data Center 30 verifies the user's ID, the Data Center ID, and the two encryptions of the Data Center's challenge to complete authentication protocol. If not verified, PC 20 is alerted and the communication terminated. Data Center 30 creates user's authentication key $K_U$ by combining secret key $K_A$ and the user's password, which is stored at Data Center 30 prior to this communication, as described below in FIGS. 5 and 6.

In the above embodiment, anyone with the user's disk with the secret key $K_A$, e.g. an attacker, can masquerade as the Data Center. Since the user's disk has the private key stored thereon, by accessing an old message, an attacker can determine the user's password. Therefore, it is important for the user to use a strong password.

Figure 4:
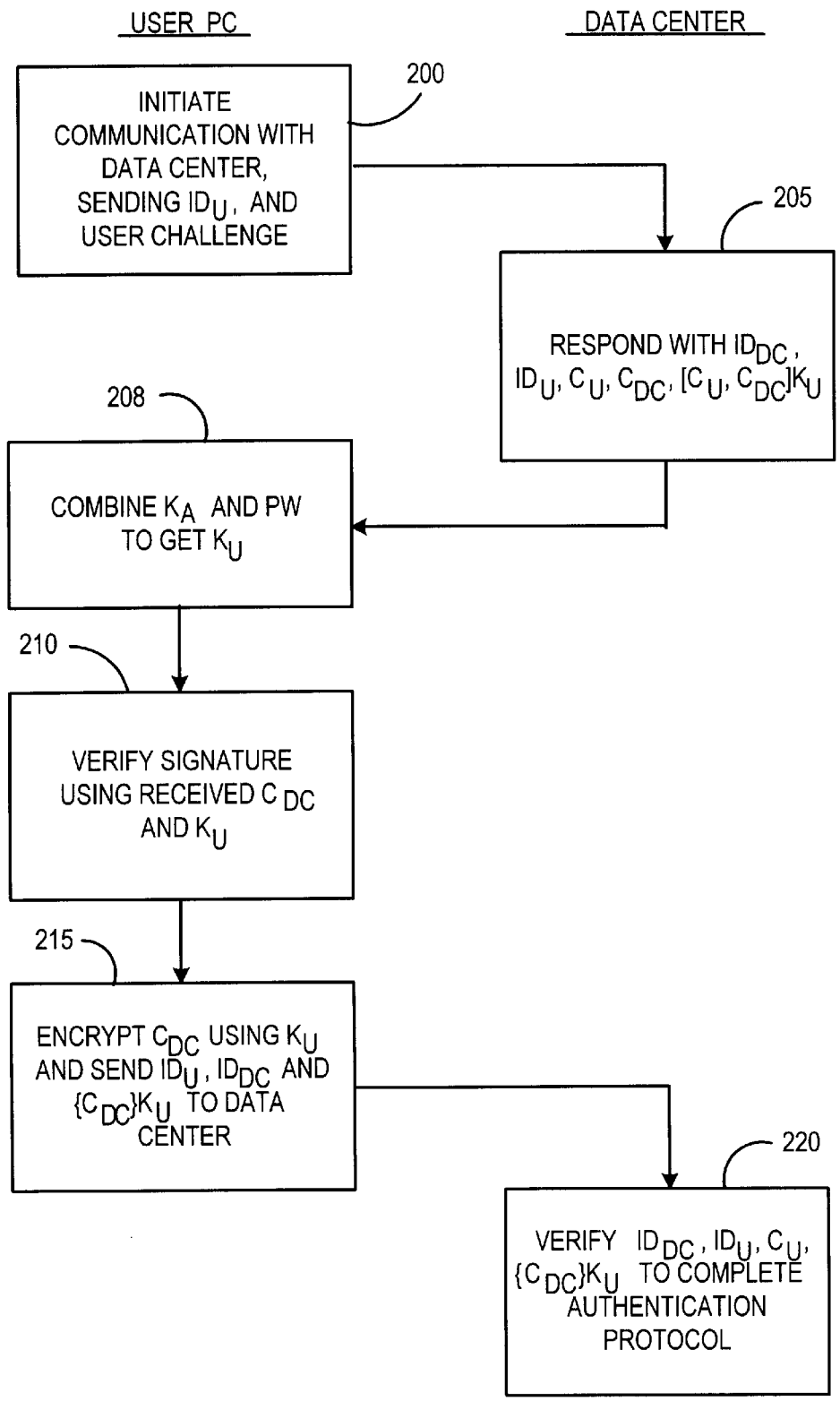
FIG. 4 is a flow chart of the preferred authentication protocol for the virtual postage metering system of FIG. 1.

Referring now to FIG. 4, the preferred embodiment of the present invention uses the user's authentication key $K_U$, which is a combination of $K_A$ and the user's password. User's authentication key $K_U$ is created in PC 20 for each communication session with Data Center 30.

At step 200, PC 20 initiates communication with Data Center 30, sending the user's ID and the user's challenge in plain text to Data Center 30. At step 205, Data Center 30 and then responds with plain text of the Data Center ID, the user's ID, the user's challenge and the Data Center's challenge, and a digital signature of the user's challenge and the Data Center's challenge signed with a user's authentication key $K_U$, which has been established prior to this communication, as described in FIGS. 5 and 6 below. At step 208, PC 20 generates $K_U$ by combining $K_A$ and the user's password. At step 210, PC 20 verifies the digital signature of the user's challenge and the Data Center's challenge using the user's authentication key $K_U$. If not verified, the Data Center is alerted and the communication terminated. At step 215, PC 20 encrypts the Data Center's challenge using the user's authentication key $K_U$. PC 20 then sends to Data Center 30 the user's ID, the Data Center ID, and the encrypted Data Center's challenge. At step 220, Data Center 30 verifies the user's ID, the Data Center ID, and the encrypted Data Center's challenge to complete authentication protocol. If not verified, PC 20 is alerted and the communication terminated.

At Data Center 30, the computations involved in the authentication protocol are carried out in the secure authentication box 40. The purpose of this box is simply to decrypt the authentication key for the protocol and to use the authentication key in a secure, tamper-proof environment.

The user and the virtual meter data center must share the key $K_A$ used in the authentication protocol. A variety of methods are available to distribute authentication keys to enable other security services for a new client. Each method uses a different means to distribute software and keying material to the mailer. In the first method, software packages are manufactured with individualized keys on each diskette. The mailer purchases a software package and installs the software on PC 20. At signup, the disk serial number is sent to the Data Center 30 so that Data Center 30 can associate the secret key with the new mailer. The mailer also chooses a password at this time, which is also sent to Data Center 30. At this time, there is no mechanism to securely communicate the mailer's sensitive information, such as the password and credit card number. However, the secret key initially on the diskette could be used as a communication key for uploading such sensitive data to Data Center 30 and for downloading a secret key for future logins.

In the second method, after signup, a diskette or dongle is manufactured with key material and sent to the mailer. The mailer must now wait to receive its key before postage can be requested and dispensed. At this time, there is no mechanism to securely communicate the mailer's sensitive information such as the password and credit card number. However, the secret key initially on the diskette could be used as a communication key for uploading such sensitive data to Data Center 30 and for downloading a secret key for future logins.

The first and second methods both place a burden on manufacturing. The following alternate methods are preferred for distributing the virtual meter software.

In a third method, a virtual meter public key is used to enable signup, downloads the software package. The software package includes the virtual meter public key. The mailer installs software into PC 20. The virtual postage metering system setup uses pseudorandom data (obtained from the mailer's machine or from the mailer's keystrokes) to seed a process which generates the authentication key. The mailer also chooses a password at this time. The mailer memorizes the password and the secret key is stored onto the hard drive or removable media (diskette or dongle). At signup, the mailer's sensitive data such as credit card information and the authentication key for the authentication protocol is encrypted with the virtual meter public key and uploaded to the virtual meter data center. Data Center 30 decrypts the sensitive data with the virtual meter private key and securely stores this data. A public key toolkit can provide the tools to enable this.

Finally, in a fourth method for distributing keys, a client public key is used to enable signup. The mailer downloads or purchases the software package and installs the software in PC 20. Setup uses pseudorandom data (obtained from the mailer's machine or from the mailer's keystrokes) to seed a process which generates a public/private key pair. The mailer also chooses and memorizes a password at this time. At signup, the mailer uploads the client public key to the virtual meter data center. Data Center 30 generates the key for the authentication protocol, encrypts it with the client public key and returns it to the mailer. The mailer decrypts the authentication key for the authentication protocol with the client private key and splits it into the secret key and the password. The secret key is stored onto the hard drive or, preferably, onto removable media (diskette or dongle). Note that this method does not allow a natural mechanism for uploading credit card information to the virtual meter data center. A public key toolkit can provide the tools to enable this.

Note that the methods employing public key cryptography are preferred. Method 3 has the advantage of being able to upload all sensitive data at sign-up whereas method 4 has the advantage of being able to control the generation of keys for the authentication protocol at Data Center 30. Clearly, the benefits of methods 3 and 4 can simultaneously be realized by using a public/private key pair for both the Data Center 30 and the mailer.

Figure 5:
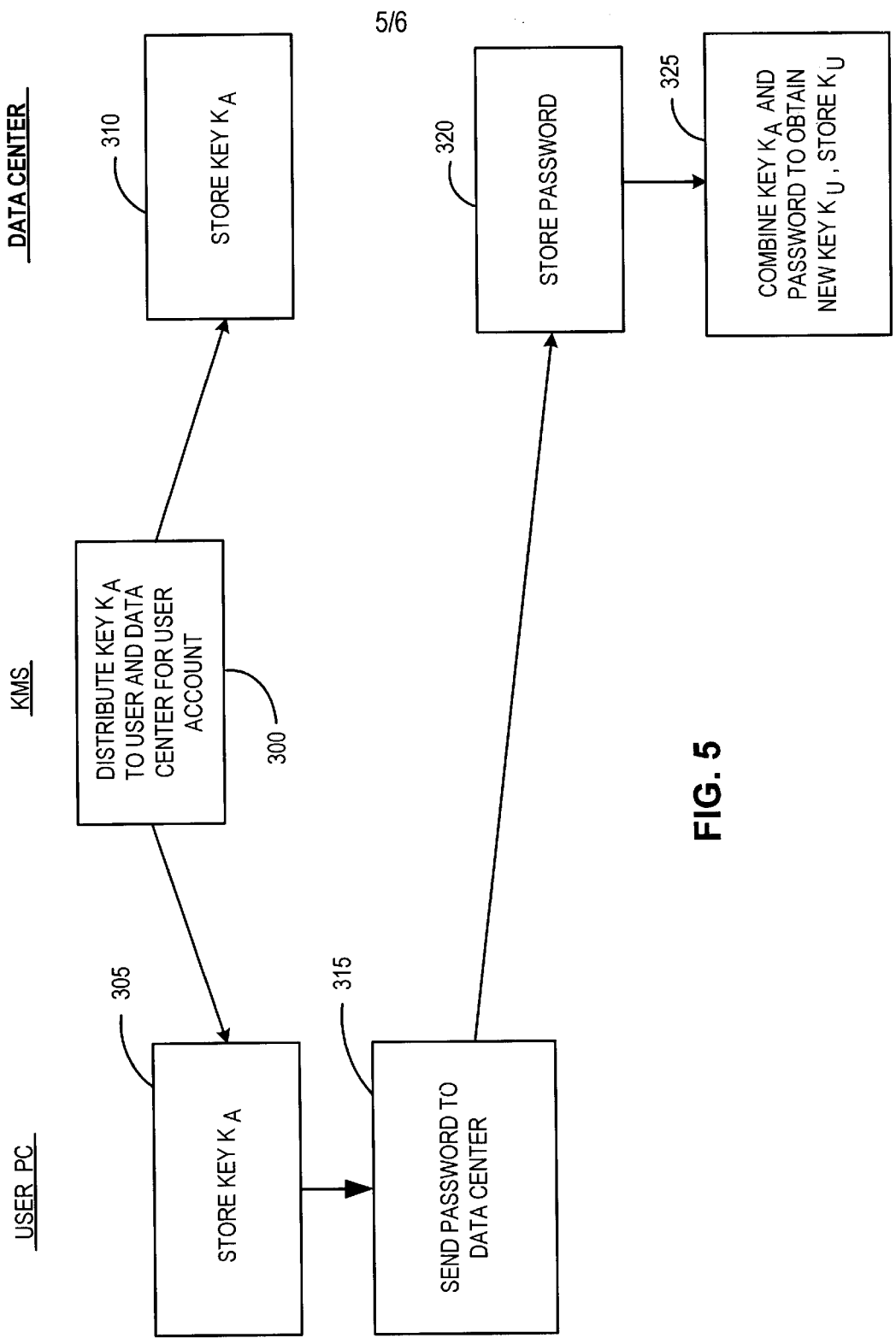
FIG. 5 is a flow chart of a preferred distribution of keys used in the present invention.

Referring now to FIG. 5, the distribution of the secret key and initialization of the authentication key for the preferred embodiment is shown. At step 300, the key management system 38 distributes the secret key $K_A$ to PC 20 (using one of the above-described methods) and to Data Center 30 for user's account. At step 305, PC 20 holds/stores the secret key $K_A$ depending on the method of distribution. At step 310, Data Center 30 stores the secret key $K_A$ in a file record for the user's account. At step 315, PC 20 sends the user password to Data Center 30. At step 320, Data Center 30 optionally stores the password in the file record for the user's account. At step 325, Data Center 30 combines the secret key and the password to create the user's authentication key $K_U$ and stores the authentication key in the file record for the user's account. Alternatively, at step 315, the PC 20 sends the user's authentication key $K_U$ Data Center 30 in lieu of sending the password. In this alternative approach, Data Center 30 does not have to create the user's authentication key $K_U$ and, therefore, does not access to the password.

Figure 6:
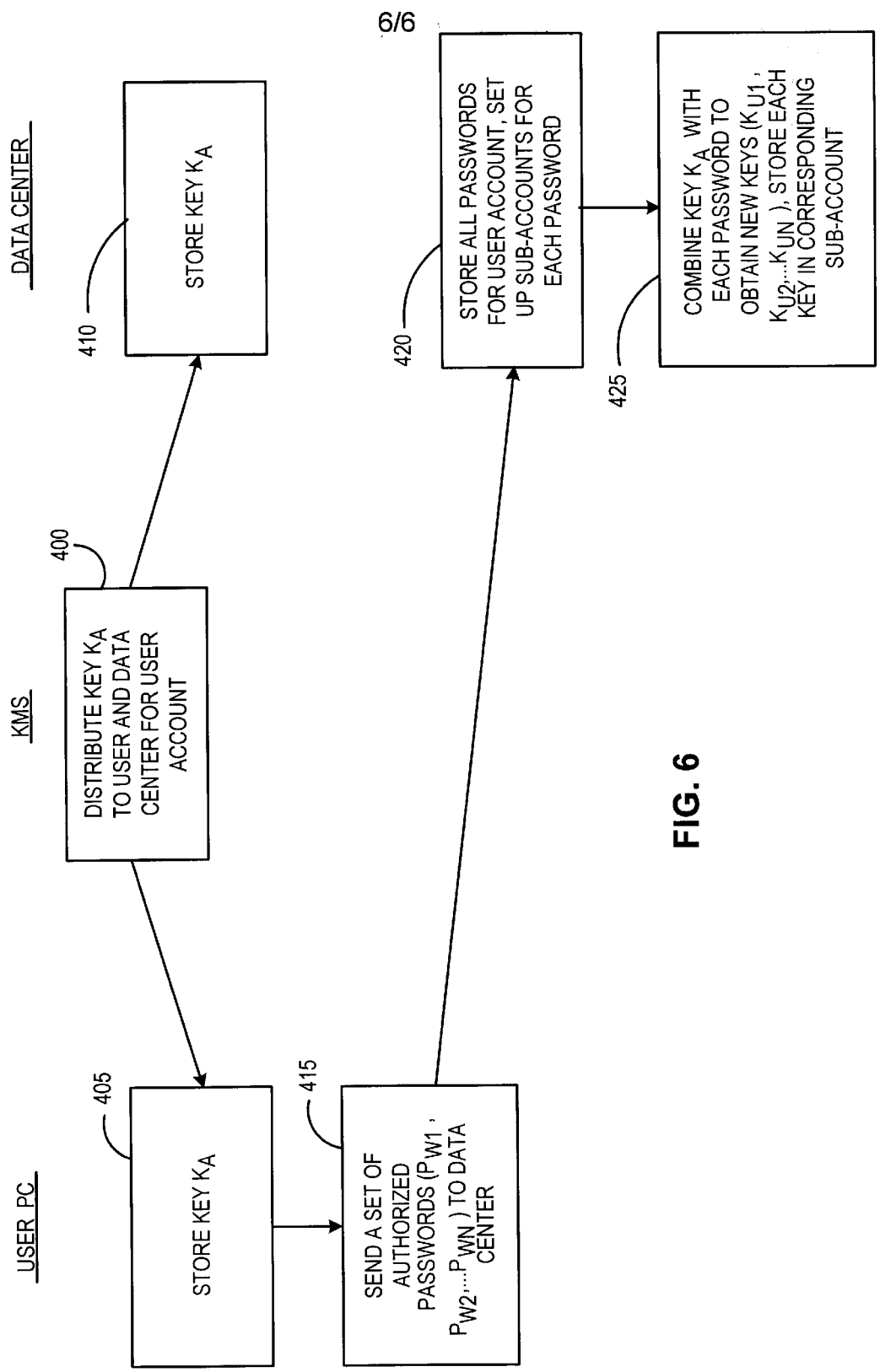
FIG. 6 is a block diagram of a virtual postage metering system providing multiple-password access for each account.

The present invention provides an additional advantage for a mailer desiring multiple sub-accounts, such as departmental accounts, within the mailer's main metering account at Data Center 30. Referring now to FIG. 6, a single mailer account may be set up for use with multiple passwords $PW_1$, $PW_2, \ldots PW_N$ using a single secret key $K_A$. At step 400, the key management system 38 distributes the secret key $K_A$ to PC 20 (using one of the above-described methods) and to Data Center 30 for the user's account. At step 405, PC 20 holds/stores the secret key $K_A$ depending on the method of distribution. At step 410, Data Center 30 stores the secret key $K_A$ in a file record for the user's account. At step 415, PC 20 sends multiple passwords $PW_1$, $PW_2, \ldots PW_N$ to Data Center 30. At step 420, Data Center 30 optionally stores the multiple passwords in corresponding sub-accounts in the file record for the user's account. At step 425, Data Center 30 combines the secret key $K_A$ with each of the multiple passwords to obtain respective authentication keys ($K_{U1}, K_{U2}, \ldots K_{UN}$) for each of the sub-accounts and stores the authentication keys in the corresponding sub-accounts in the file record for the user's account.

Steps 320 and 420 are optional because once the user's authentication key $K_U$ is created, Data Center 30 no longer needs access to the secret key $K_A$ and the user's password(s). Although stored user password(s) at Data Center 30 can be used when a user forgets a password, other methods can be used to recover from a lost password. See, for example, U.S. Pat. No. 5,590,198.

It will be understood that, although the embodiments of the present invention are described as postage metering systems, the present invention is applicable to any value metering system that includes transaction evidencing, such as monetary transactions, item transactions and information transactions.

While the present invention has been disclosed and described with reference to embodiments thereof, it will be apparent, as noted above, that variations and modifications, such as using public keys instead of private keys, may be made therein. It is, thus, intended in the following claims to cover each variation and modification that falls within the true spirit and scope of the present invention.

Personal Post Office™ is a trademark of Pitney Bowes Inc., the assignee of the present invention.

What is claimed is:

1. A method of remotely accessing a postage security account at a data center from a remote user device, the method comprising the steps of:

providing a password to a user;

providing to a remote user device a cryptographic key corresponding to a postage security account at a data center;

combining the password and the cryptographic key to obtain a user authentication key;

performing an authentication algorithm using the user authentication key to obtain a remote access message;

sending the remote access message to the data center to initiate a request for access to the postage security account by the remote user device; and authenticating the remote user device requesting access to the postage security account by verifying the remote access message.

2. The method of claim 1 comprising the further step of:
providing the password to the data center wherein the combining step is performed by the remote user device and the data center.

3. The method of claim 1 comprising the further step of:
providing the password to the data center wherein the combining step is performed by the remote user device for each communication session with the data center and is performed by the data center during only an initial communication session.

4. The method of claim 1 comprising the further steps of:
sending the password from the remote user device to the data center during an initialization communication; and
storing the user authentication key at the data center.

5. The method of claim 1 comprising the further steps of:
sending the user authentication key from the remote user device to the data center during an initialization communication; and
storing the user authentication key at the data center.

6. The method of claim 1 wherein the cryptographic key is provided to the user on portable media.

7. The method of claim 6 wherein the portable media is a diskette.

8. A method of remotely accessing a transaction evidencing account at a data center from a remote user device, the method comprising the steps of:
providing a password to a user;
providing to a remote user device a cryptographic key corresponding to the transaction evidencing account at a data center;
combining the password and the cryptographic key to obtain a user authentication key;
performing an authentication algorithm using the user authentication key to obtain a remote access message;
sending the remote access message to the data center to initiate a request for access to the transaction evidencing account; and
authenticating the remote user device requesting access to the transaction evidencing account by verifying the remote access message.

9. The method of claim 8 comprising the further step of:
providing the password to the data center wherein the combining step is performed by the remote user device and the data center.

10. The method of claim 8 comprising the further step of:
providing the password to the data center wherein the combining step is performed by the remote user device for each communication session with the data center and is performed by the data center during only an initial communication session.

11. The method of claim 8 comprising the further steps of:
sending the password from the remote user device to the data center during an initialization communication; and
storing the user authentication key at the data center.

12. The method of claim 8 wherein the cryptographic key is provided to the user on portable media.

13. The method of claim 12 wherein the portable media is a diskette.

* * * * *

UNITED STATES PATENT AND TRADEMARK OFFICE
CERTIFICATE OF CORRECTION

PATENT NO. : 6,567,794 B1  Page 1 of 1
DATED : May 20, 2003
INVENTOR(S) : Cordery et al.

It is certified that error appears in the above-identified patent and that said Letters Patent is hereby corrected as shown below:

<u>Title page,</u>
Items [75], and [22] are corrected and Items [86] and [87] are added as follows:
-- [75] Inventors: Robert A. Cordery, Danbury, CT (US);
 Frank M. D'Ippolito, Arlington, MA (US);
 Frederick W. Ryan, Jr., Oxford, CT (US)
[22] PCT Filed: June 12, 1998
[86] PCT No.: PCT/US98/12206
 371(c)(1),
 (2), (4) Date: Sep. 2, 1999
[87] PCT Pub. No.: WO98/57460
 PCT Pub. Date: Dec. 17, 1998 --

Signed and Sealed this

Twenty-third Day of March, 2004

JON W. DUDAS
*Acting Director of the United States Patent and Trademark Office*